United States Patent
Bian (10) Patent No.: US 11,493,686 B2
(45) Date of Patent: Nov. 8, 2022

(54) OPTICAL COMPONENTS WITH POWER-HANDLING ASSISTANCE

(71) Applicant: GLOBALFOUNDRIES U.S. Inc., Santa Clara, CA (US)

(72) Inventor: Yusheng Bian, Ballston Lake, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 17/227,843

(22) Filed: Apr. 12, 2021

(65) Prior Publication Data
US 2022/0326434 A1 Oct. 13, 2022

(51) Int. Cl.
*G02B 6/12* (2006.01)
*G02B 6/122* (2006.01)
*G02B 6/13* (2006.01)

(52) U.S. Cl.
CPC ......... *G02B 6/12002* (2013.01); *G02B 6/122* (2013.01); *G02B 6/13* (2013.01); *G02B 2006/12061* (2013.01)

(58) Field of Classification Search
None
See application file for complete search history.

(56) References Cited

U.S. PATENT DOCUMENTS

| | | | |
|---|---|---|---|
| 10,429,582 B1 | 10/2019 | Bian et al. | |
| 10,436,982 B1 | 10/2019 | Bian et al. | |
| 11,092,740 B1* | 8/2021 | Bian | G02B 6/126 |
| 11,181,693 B1* | 11/2021 | Bian | G02B 6/2852 |
| 2004/0087049 A1* | 5/2004 | Gill | G02B 6/12007 438/31 |
| 2007/0114628 A1* | 5/2007 | Barrios | H01S 3/083 257/432 |
| 2008/0152279 A1* | 6/2008 | Feng | G02B 6/1223 385/28 |
| 2011/0206323 A1* | 8/2011 | Zhang | G02B 6/12007 427/163.2 |
| 2014/0233901 A1* | 8/2014 | Hatori | G02B 6/43 385/129 |
| 2020/0026000 A1* | 1/2020 | Bian | G02B 6/107 |

OTHER PUBLICATIONS

Y. Ishizaka et al. Transmission-efficient structures of bent and crossing silicon slot waveguides. IEEE Photonics Journal, vol. 5 No. 5, Oct. 2013. DOI: 10.1109/JPHOT.2013.2281975 (Year: 2013).*

(Continued)

*Primary Examiner* — Michael Stahl
(74) *Attorney, Agent, or Firm* — Thompson Hine LLP; Anthony Canale (57) ABSTRACT

Structures for an optical component of a photonics chip and methods of forming a structure for an optical component of a photonics chip. The structure includes a slotted waveguide component having a first and second waveguide cores over a dielectric layer. The first waveguide core separated from the second waveguide core by a slot. The structure further includes a third waveguide core over the dielectric layer. The third waveguide core is positioned in a different level relative to the dielectric layer than the slotted waveguide component, and the third waveguide core and the first slot have an overlapping arrangement.

20 Claims, 6 Drawing Sheets

(56) References Cited

OTHER PUBLICATIONS

Kevin K. Dezfulian et al., "Hybrid Edge Couplers With Layers in Multiple Levels" filed Feb. 8, 2021 as U.S. Appl. No. 17/169,971.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

M. Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest Optical Society of America, 2020), paper T3H.3.

Y. Bian, et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.

Wilmart, et al., "A Versatile Silicon-Silicon Nitride Photonics Platform for Enhanced Functionalities and Applications" Applied Sciences. 2019; 9(2):255.

C. A. Barrios, et al., "Demonstration of slot-waveguide structures on silicon nitride / silicon oxide platform," Opt. Express 15, 6846-6856 (2007).

Selvaraja et al., "Review on Optical Waveguides", Emerging Waveguide Technology, Chapter 6, Published Aug. 1, 2018.

Steglich, "Silicon-on-Insulator Slot Waveguides: Theory and Applications in Electro-Optics and Optical Sensing", Emerging Waveguide Technology, Chapter 10, Published Aug. 1, 2018.

\* cited by examiner

OPTICAL COMPONENTS WITH POWER-HANDLING ASSISTANCE

BACKGROUND

The present invention relates to photonics chips and, more specifically, to structures for an optical component of a photonics chip and methods of forming a structure for an optical component of a photonics chip.

Photonics chips are used in many applications and systems including, but not limited to, data communication systems and data computation systems. A photonics chip integrates optical components, such as waveguides, optical switches, optical power splitters, and directional couplers, and electronic components, such as field-effect transistors, into a unified platform. Among other factors, layout area, cost, and operational overhead may be reduced by the integration of both types of components on the same chip.

Silicon-based optical components may suffer from power-dependent loss because, for input optical powers exceeding a certain threshold, the output optical power begins to nonlinearly increase. As a result, silicon-based optical components may be prone to damage induced by high input optical powers. Despite this lack of robustness, a photonics chip requires certain silicon-based active optical components, such as optical modulators.

Improved structures for an optical component of a photonics chip and methods of forming a structure for an optical component of a photonics chip are needed.

SUMMARY

In an embodiment of the invention, a structure for an optical component of a photonics chip is provided. The structure includes a dielectric layer and a slotted waveguide component having a first waveguide core and a second waveguide core over the dielectric layer. The first waveguide core separated from the second waveguide core by a slot. The structure further includes a third waveguide core over the dielectric layer. The third waveguide core is positioned in a different level relative to the dielectric layer than the slotted waveguide component, and the third waveguide core and the first slot have an overlapping arrangement.

In an embodiment of the invention, a method of forming a structure for an optical component of a photonics chip is provided. The method includes forming a slotted waveguide component including a first waveguide core and a second waveguide core over a dielectric layer, and forming a third waveguide core over the dielectric layer. The first waveguide core is separated from the second waveguide core by a slot, the third waveguide core positioned in a different level relative to the dielectric layer than the slotted waveguide component, and the third waveguide core and the slot have an overlapping arrangement.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
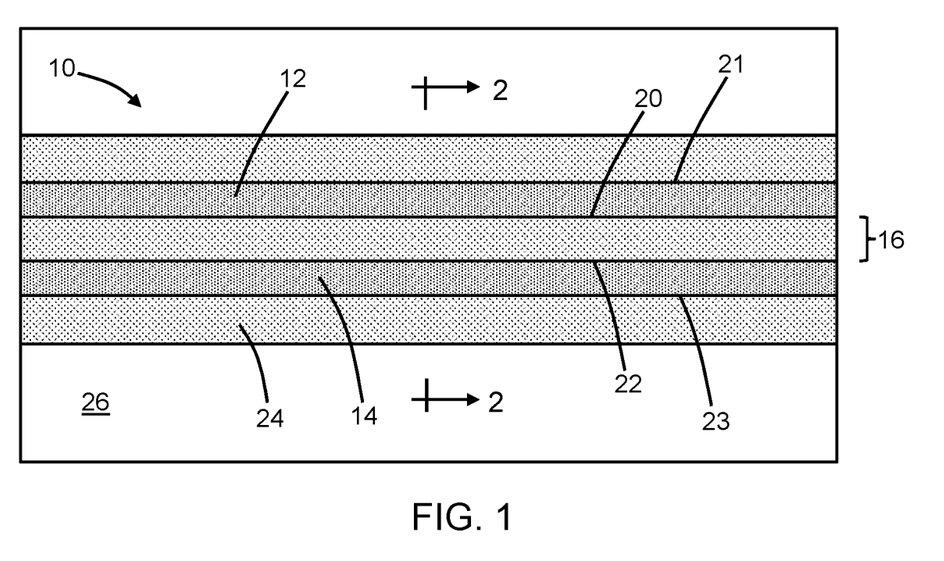
FIG. 1 is a diagrammatic top view of a photonics chip including a structure at an initial fabrication stage of a processing method in accordance with embodiments of the invention.
Figure 2:
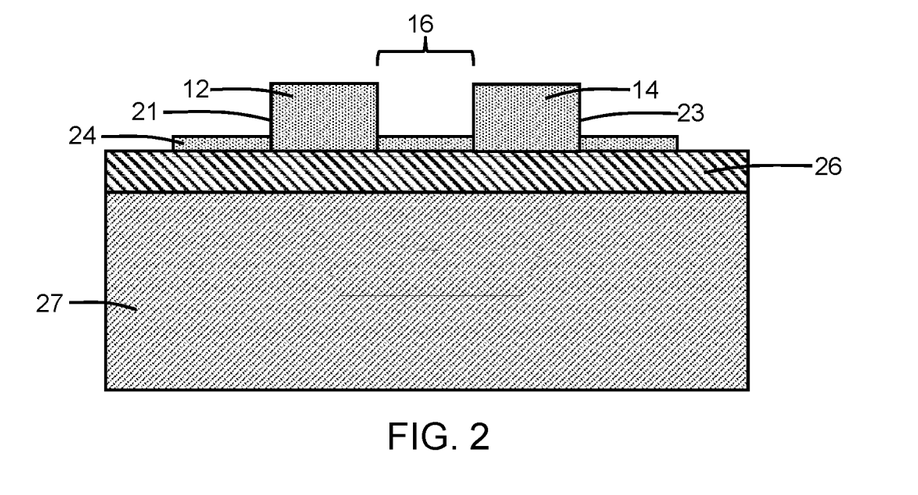
FIG. 2 is a cross-sectional view of the structure taken generally along line 2-2 in FIG.

With reference to FIGS. 1, 2 and in accordance with embodiments of the invention, a structure 10 for an optical component includes a waveguide core 12 and a waveguide core 14 that is laterally spaced from the waveguide core 12 by a gap or slot 16. The waveguide core 12 may have a side surface 20 and a side surface 21 opposite to the side surface 20, the waveguide core 14 may have a side surface 22 and a side surface 23 opposite to the side surface 22, and the slot 16 may be positioned between the side surface 20 of the waveguide core 12 and the side surface 22 of the waveguide core 14. A slab layer 24 is coupled to respective lower portions of the waveguide cores 12, 14. The slab layer 24 includes a portion positioned within the slot 16 between the waveguide cores 12, 14 and respective portions that extend laterally outward beyond the side surface 21 of the waveguide core 12 and the side surface 23 of the waveguide core 14. The lower portions of the waveguide cores 12, 14 connected by the slab layer 24 have a height equal to the thickness of the slab layer 24. The waveguide cores 12, 14 provide a slotted waveguide component in which the waveguide cores 12, 14 are positioned side-by-side and in which both waveguide cores 12, 14 participate in guiding optical signals in contrast to rib waveguides or ridge waveguides.

The waveguide cores 12, 14 and slab layer 24 may be comprised of a semiconductor material, such as single-crystal silicon, and may be positioned on and over a dielectric layer 26. In an embodiment, the dielectric layer 26 may be provided by a buried oxide layer of a silicon-on-insulator substrate that further includes a device layer and a handle substrate 27. In an embodiment, the waveguide cores 12, 14 may be patterned from the device layer by lithography and etching processes without etching fully through the device layer to initially form the slab layer 24 and, subsequently, the slab layer 24 may be patterned to shape with a separate set of lithography and etching processes from the partially-etched portions of the device layer. The dielectric layer 26 may operate as an etch stop when patterning the slab layer 24. The slab layer 24 is thinner than the waveguide cores 12, 14 and, in an embodiment, the thickness of the slab layer 24 is significantly less than the thickness of the waveguide cores 12, 14.

Figure 3:
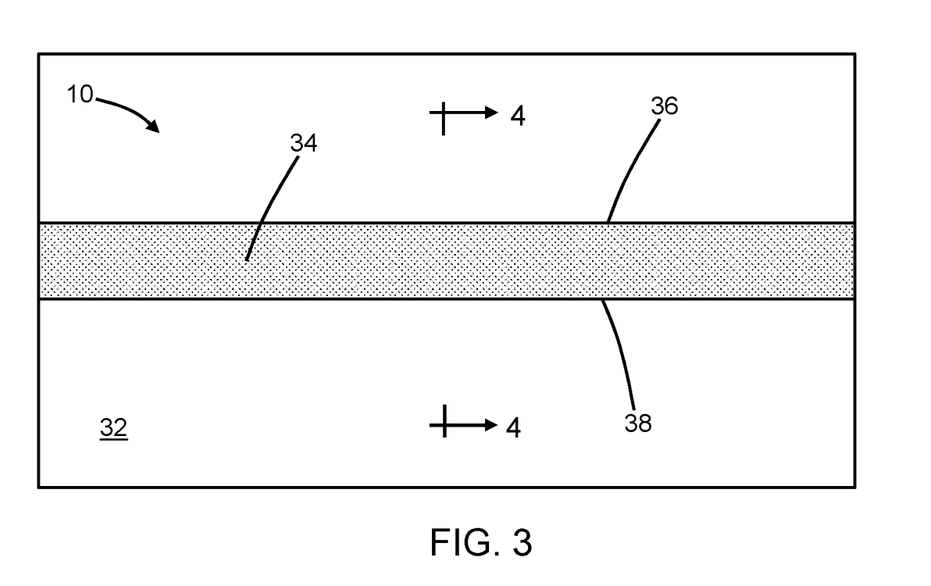
FIG. 3 is a diagrammatic top view of the structure at a fabrication stage of the processing method subsequent to FIG. 1.
Figure 4:
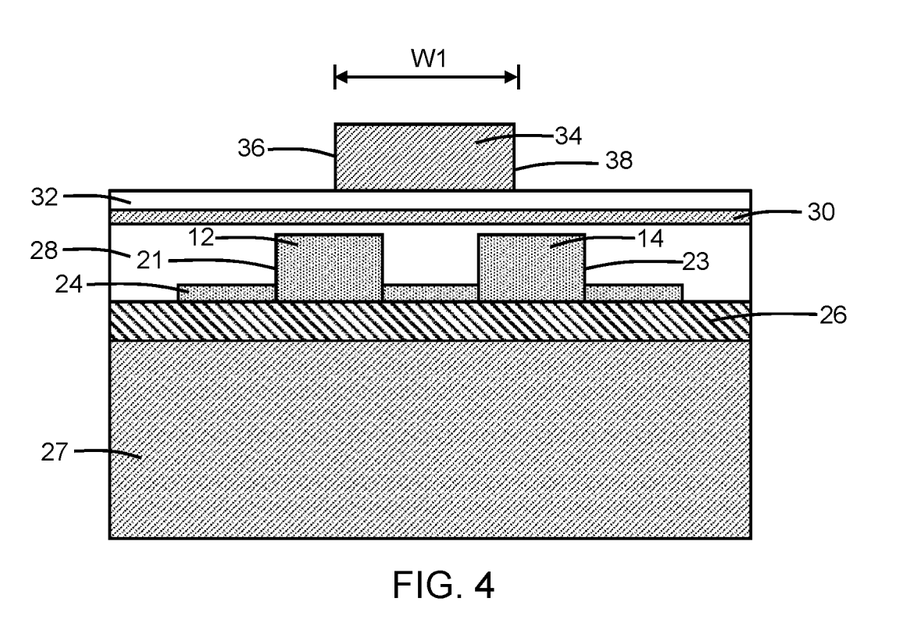
FIG. 4 is a cross-sectional view of the structure taken generally along line 4-4 in FIG. 3.

With reference to FIGS. 3, 4 in which like reference numerals refer to like features in FIGS. 1, 2 and at a subsequent fabrication stage, a dielectric layer 28 is formed over the waveguide cores 12, 14 and dielectric layer 26. The waveguide cores 12, 14 and slab layer 24 may be embedded and buried in the dielectric material of the dielectric layer 28. In particular, a portion of the dielectric layer 28 may fill the slot 16 between the waveguide core 12 and the waveguide core 14. The dielectric layer 28 may be comprised of a dielectric material, such as silicon dioxide, having a lower index than the material of the waveguide cores 12, 14. Light propagating as optical signals in the waveguide cores 12, 14 is primarily confined in the low-index dielectric material in the slot 16 between the high-index waveguide cores 12, 14 defining the slotted waveguide component, which contrasts with rib and ridge waveguides in which light is confined primarily in the high-index material of the waveguide core. Additional dielectric layers 30, 32 may be formed on the dielectric layer 28 and may be respectively comprised of silicon nitride and silicon dioxide. In an alternative embodiment, the dielectric layer 30 may be omitted.

A waveguide core 34 is formed on the dielectric layer 32 and over the dielectric layer 26 and handle substrate 27. The waveguide core 34 may be coterminous at its opposite ends with the respective opposite ends of the waveguide cores 12, 14. In the structure 10, the waveguide core 34 is positioned in a different level relative to the dielectric layer 26 and handle substrate 27 than the waveguide cores 12, 14 and slab layer 24. In the representative embodiment, the waveguide core 34 is positioned in the structure 10 over the waveguide cores 12, 14 and slab layer 24. The waveguide core 34 may be formed by depositing a layer of its constituent material on the dielectric layer 32 and patterning the deposited layer with photolithography and etching processes. In an embodiment, the waveguide core 34 may be comprised of a dielectric material, such as silicon nitride.

The waveguide core 34 may have a side surface 36 and a side surface 38 opposite to the side surface 36. In the representative embodiment, the waveguide core 34 is positioned to overlap with the slot 16 between the waveguide core 12 and the waveguide core 14 in an overlapping arrangement. In an embodiment, the waveguide core 34 may be centered over the slot 16 between the waveguide cores 12, 14 such that the slot 16 is located between the side surfaces 36, 38. In an embodiment, the waveguide core 34 may fully overlap with the slot 16 such that the side surface 36 is positioned over the waveguide core 12 and the side surface 38 is positioned over the waveguide core 14. In an embodiment, the side surface 36 of the waveguide core 34 may be positioned over the waveguide core 12 and between its opposite side surfaces 20, 21. In an embodiment, the side surface 38 of the waveguide core 34 may be positioned over the waveguide core 14 and between its opposite side surfaces 22, 23. In an embodiment, the waveguide core 34 may have a width W1 that is greater than the width of either of the waveguide cores 12, 14.

In embodiments, the structure 10 may be used in active optical components such as an optical modulator. In an embodiment, the structure 10 may be deployed as a passive optical component to route optical signals on a photonics chip and may include one or more bends. In an alternative embodiment, the slab layer 24 may be omitted from the structure 10. In an alternative embodiment, the waveguide cores 12, 14 and slab layer 24 may be tapered and/or the waveguide core 34 may be tapered. In an alternative embodiment, the waveguide cores 12, 14, slab layer 24, and waveguide core 34 may be duplicated, and the duplicate may be placed adjacent to the waveguide cores 12, 14, slab layer 24, and waveguide core 34 in order to define, for example, an optical coupler as a passive optical component.

Figure 5:
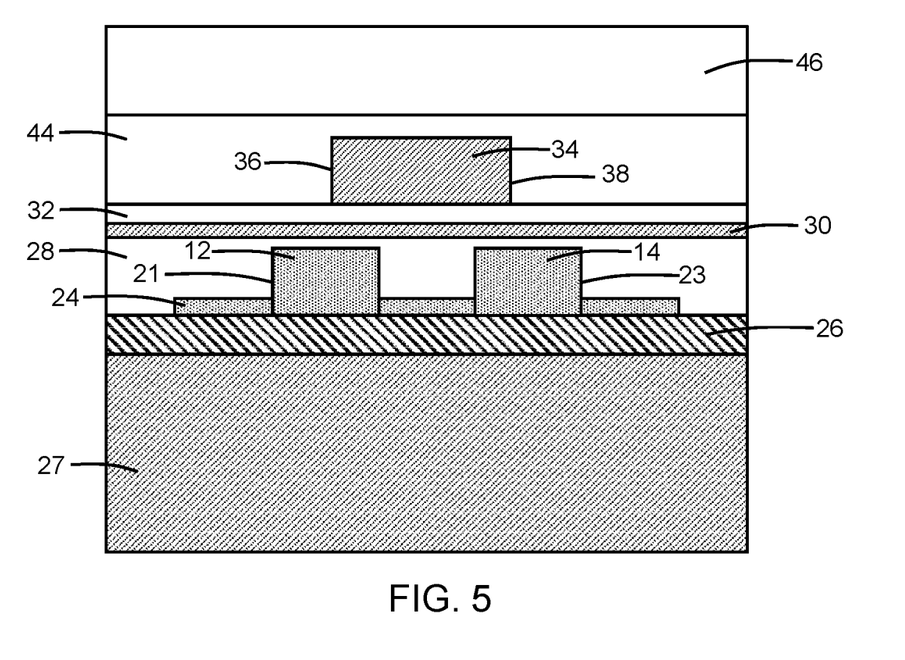
FIG. 5 is a cross-sectional view of the structure at a fabrication stage subsequent to FIG. 4.

With reference to FIG. 5 in which like reference numerals refer to like features in FIGS. 3, 4 and at a subsequent fabrication stage, a dielectric layer 44 may be formed over the waveguide core 34 and dielectric layer 32. The dielectric layer 44 may be comprised of a dielectric material, such as silicon dioxide, deposited by chemical vapor deposition. The waveguide core 34 may be embedded and buried in the dielectric material of the dielectric layer 44.

A back-end-of-line stack 46 may be formed over the dielectric layer 44. The back-end-of-line stack 46 includes one or more dielectric layers that may be comprised of dielectric material, such as silicon dioxide, and metallization comprised of, for example, copper or aluminum, that is arranged in the one or more interlayer dielectric layers.

The structure 10, in any of its embodiments described herein, may be integrated into a photonics chip that includes electronic components and additional optical components. For example, the electronic components may include field-effect transistors that are fabricated by CMOS front-end-of-line (FEOL) processing.

The waveguide core 34 may permit the slotted waveguide component including the waveguide cores 12, 14 and slab layer 24 to handle higher optical powers without incurring damage and, in addition, may mitigate power-dependent loss of optical power. The power density inside the waveguide cores 12, 14 may be reduced through the assistance of the waveguide core 34 such that the structure 10 can handle a higher optical power, which effectively raises the threshold at which the output optical power begins to nonlinearly increase. The addition of the waveguide core 34 is compatible with the silicon-based optical components of a monolithic silicon photonics platform and compatible with a process flow that also forms silicon-based optical components.

Figure 6:
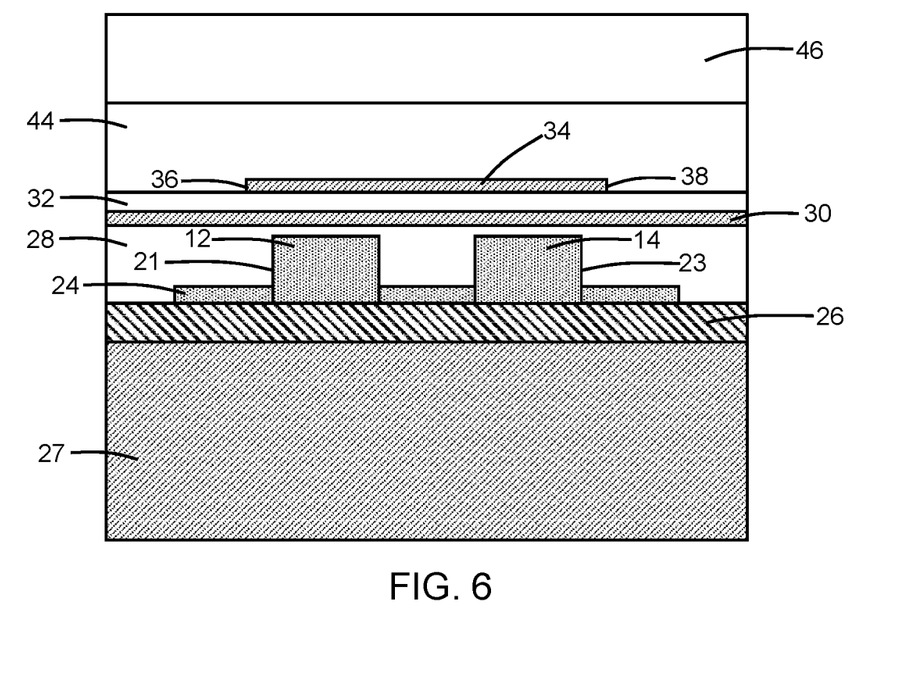
FIGS. 6-12 are cross-sectional views of structures in accordance with alternative embodiments of the invention.

With reference to FIG. 6 in which like reference numerals refer to like features in FIG. 5 and in accordance with alternative embodiments of the invention, the waveguide core 34 may be flattened by increasing its width and decreasing its height to define a shape that resembles a slab in cross-sectional profile. The side surfaces 36, 38 of the waveguide core 34 may be extended outwardly such that the side surface 36 is no longer positioned over the waveguide core 12 and the side surface 38 is no longer positioned over the waveguide core 14.

Figure 7:
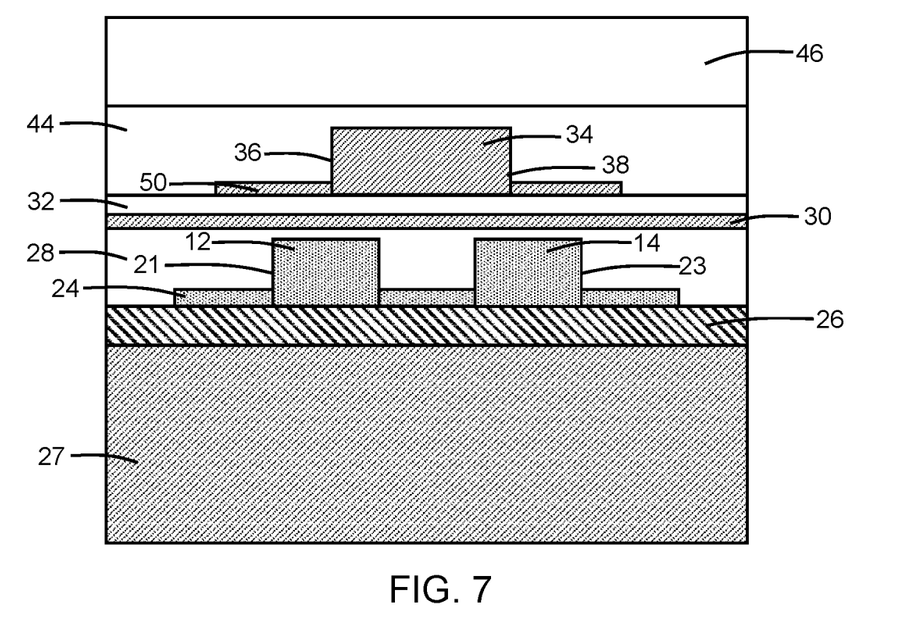

With reference to FIG. 7 in which like reference numerals refer to like features in FIG. 5 and in accordance with alternative embodiments of the invention, the structure 10 may be modified to add a slab layer 50 that is coupled to a lower portion of the waveguide core 34 such that the waveguide core 34 has a rib construction. Portions of the slab layer 50 may extend outwardly beyond the side surfaces 36, 38 of the waveguide core 34. In an alternative embodiment, the slab layer 24 may be omitted from the structure 10.

Figure 8:
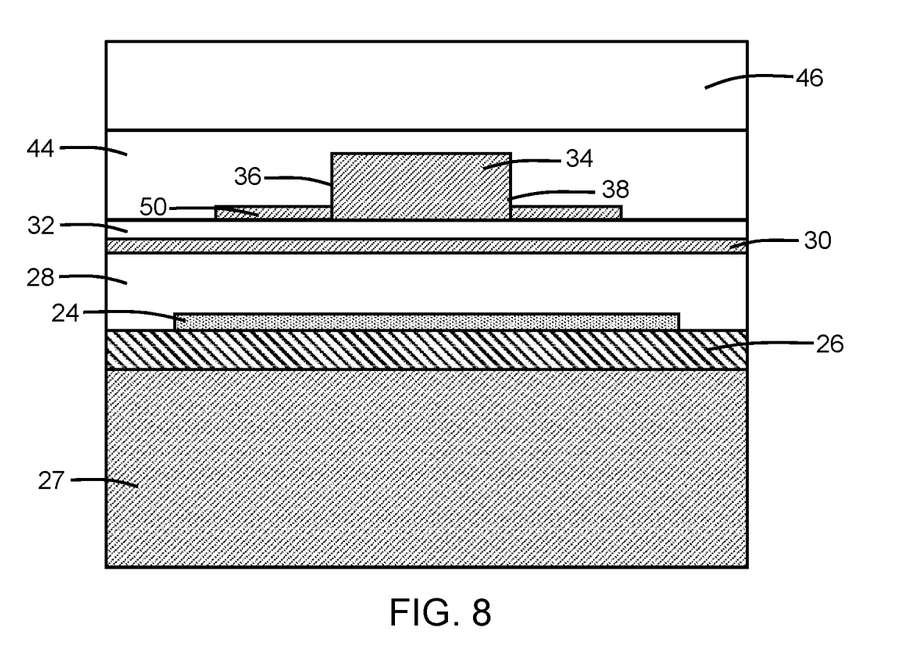

With reference to FIG. 8 in which like reference numerals refer to like features in FIG. 7 and in accordance with alternative embodiments of the invention, the structure 10 may be modified to eliminate the waveguide cores 12, 14 such that only the slab layer 24 is positioned below the waveguide core 34 and slab layer 50.

Figure 9:
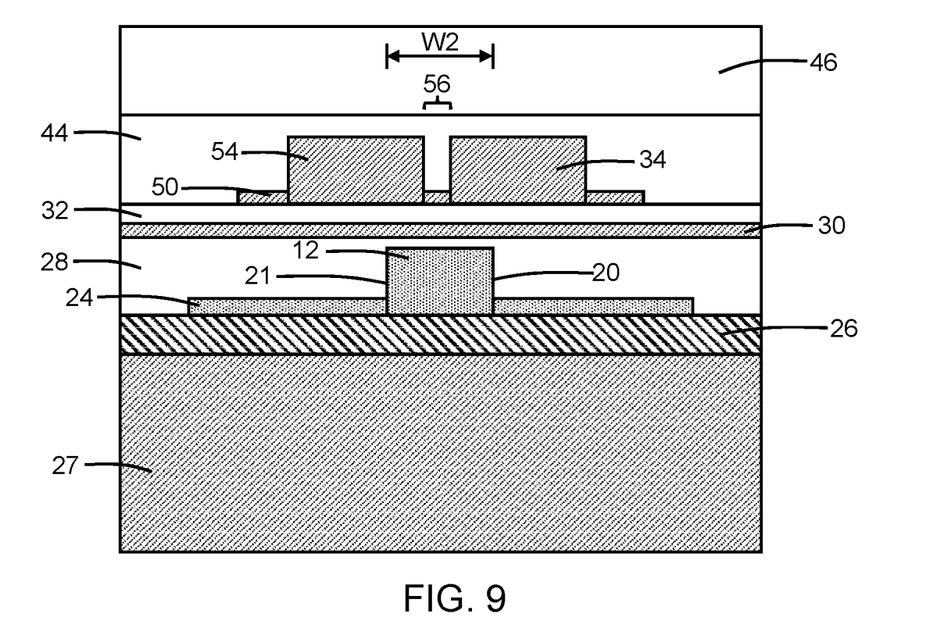

With reference to FIG. 9 in which like reference numerals refer to like features in FIG. 7 and in accordance with alternative embodiments of the invention, the structure 10 may be modified to add another waveguide core 54 that is positioned adjacent to the waveguide core 34, and the structure 10 may also be modified to eliminate the waveguide core 14. The waveguide cores 34, 54, which are both positioned on the dielectric layer 32 over the dielectric layer 26 and handle substrate 27, are separated by a slot 56. In the structure 10, the waveguide cores 34, 54 are positioned in a different level relative to the dielectric layer 26 and the handle substrate 27 than the waveguide core 12. In the representative embodiment, the waveguide cores 34, 54 are positioned in the structure 10 over the waveguide core 12. In an embodiment, the slot 56 may overlap with the underlying waveguide core 12 in an overlapping arrangement. In an embodiment, the slot 56 may be centered over the underlying waveguide core 12 and therefore located between its side surfaces 20, 21. In an embodiment, the slot 56 may have a width that is less than the width W2 of the underlying waveguide core 12. In an embodiment, the waveguide core 12 and the slot 56 may fully overlap such that the side surface 21 positioned below the waveguide core 54 and the side surface 20 positioned below the waveguide core 34.

In the representative embodiment, the slab layer 50 is coupled to respective lower portions of the waveguide cores 34, 54. In an alternative embodiment, the slab layer 50 may be omitted from the structure 10. In an alternative embodiment, the slab layer 24 may be omitted from the structure 10. In an alternative embodiment, the slab layer 24 and the slab layer 50 may both be omitted from the structure 10.

Figure 10:
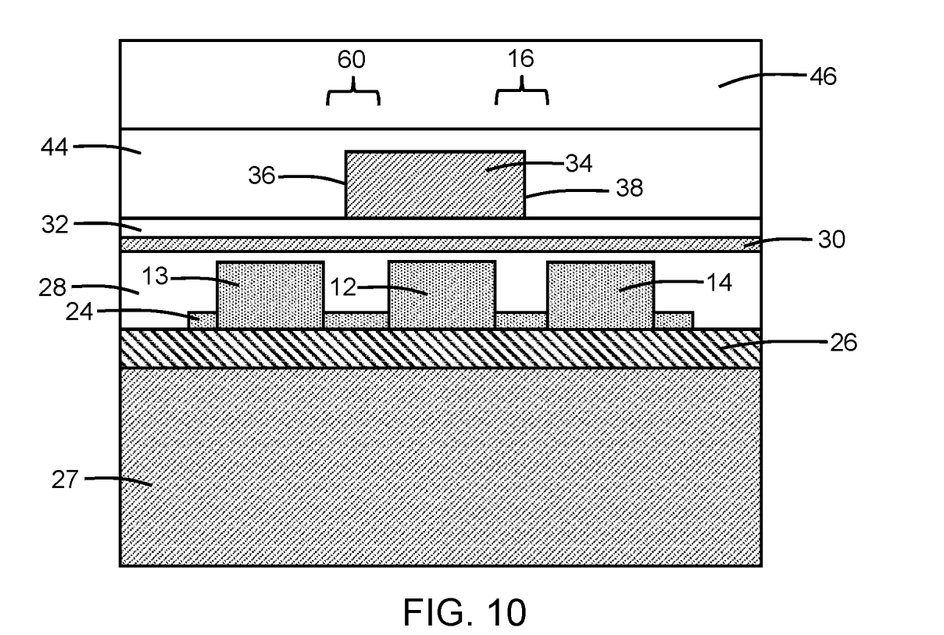

With reference to FIG. 10 in which like reference numerals refer to like features in FIG. 5 and in accordance with alternative embodiments of the invention, the structure 10 may be modified to add another waveguide core 13 that is positioned adjacent to the waveguide core 12 over the dielectric layer 26 and handle substrate 27. The addition of the waveguide core 13 forms an additional slot 60 between the waveguide core 12 and the waveguide core 13 such that a pair of slots is present in the slotted waveguide component. In the structure 10, the waveguide cores 12, 13, 14 are all positioned in a different level relative to the dielectric layer 26 and handle substrate 27 than the waveguide core 34. The waveguide core 34 may have a width chosen such that the waveguide core 34 at least partially overlaps with the slot 60 between the waveguide cores 12, 13 and at least partially overlaps with the slot 16 between the waveguide cores 12, 14 in respective overlapping arrangements.

Figure 11:
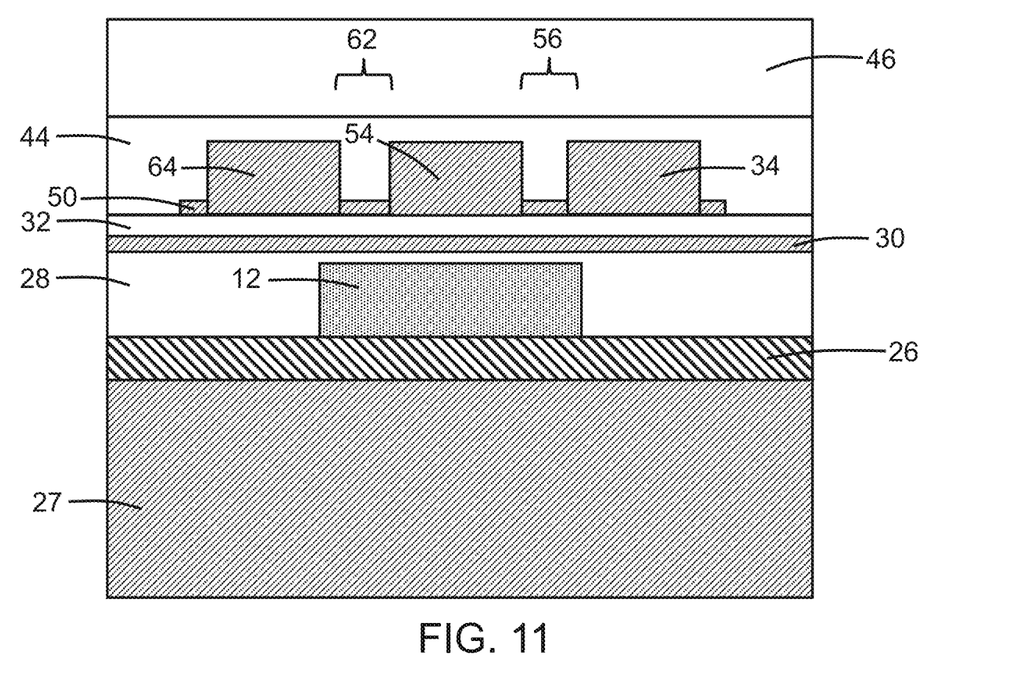

With reference to FIG. 11 in which like reference numerals refer to like features in FIG. 9 and in accordance with alternative embodiments of the invention, the structure 10 may be modified to add another waveguide core 64 that is positioned adjacent to the waveguide core 54, and to eliminate the waveguide core 14 and slab layer 24. In the structure 10, the waveguide cores 54, 65 are positioned in a different level relative to the dielectric layer 26 and handle substrate 27 than the waveguide core 12. The addition of the waveguide core 64 forms an additional slot 62 between the waveguide core 54 and the waveguide core 64 such that a pair of slots is present in the slotted waveguide component. The waveguide core 12 may have a width chosen such that the slot 60 between the waveguide cores 54, 64 at least partially overlaps with the waveguide core 12, and the slot 56 between the waveguide cores 34, 54 also at least partially overlaps with the waveguide core 12.

Figure 12:
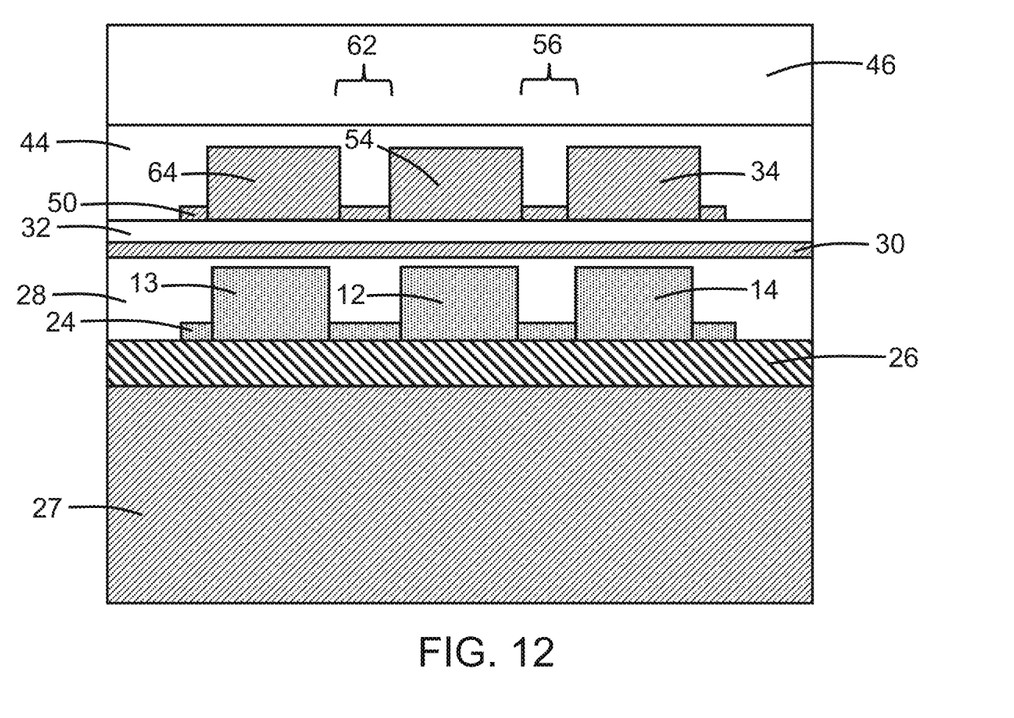

With reference to FIG. 12 and in accordance with alternative embodiments of the invention, the structure 10 may be modified such that the waveguide cores 12, 13, 14 and slab layer 24 are positioned in a level below the level containing the waveguide cores 34, 54, 64 and slab layer 50. The slots 16, 60 and the waveguide cores 12, 13, 14 may at least partially overlap with slots 56, 62 and the waveguide cores 34, 54, 64.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an optical component of a photonics chip, the structure comprising:
    a first dielectric layer;
    a slotted waveguide component including a first waveguide core and a second waveguide core over the first dielectric layer, the first waveguide core separated from the second waveguide core by a first slot;
    a third waveguide core over the first dielectric layer, the third waveguide core positioned in a different level relative to the first dielectric layer than the slotted waveguide component;
    a first slab layer coupled to a lower portion of the third waveguide core; and
    a second slab layer coupled to a lower portion of the first waveguide core and a lower portion of the second waveguide core, wherein the third waveguide core and the first slot have an overlapping arrangement, the first slab layer is thinner than the third waveguide core, and the second slab layer is thinner than the first waveguide core and the second waveguide core.

2. The structure of claim 1 wherein the slotted waveguide component is positioned between the third waveguide core and the first dielectric layer.

3. The structure of claim 2 wherein the third waveguide core comprises silicon nitride, and the slotted waveguide component comprises silicon.

4. The structure of claim 1 wherein the third waveguide core is positioned between the slotted waveguide component and the first dielectric layer.

5. The structure of claim 4 wherein the third waveguide core comprises silicon, and the slotted waveguide component comprises silicon nitride.

6. The structure of claim 1 wherein the third waveguide core and the first slot are centered relative to each other in the overlapping arrangement.

7. The structure of claim 1 wherein the slotted waveguide component includes a fourth waveguide core separated by a second slot from the second waveguide core.

8. The structure of claim 1 further comprising:
a second dielectric layer arranged between the slotted waveguide component and the third waveguide core.

9. The structure of claim 1 wherein the third waveguide core and the first slot fully overlap.

10. The structure of claim 1 further comprising:
a fourth waveguide core arranged adjacent to the third waveguide core, the fourth waveguide core separated from the third waveguide core by a second slot.

11. A method of forming a structure for an optical component of a photonics chip, the method comprising:
forming a slotted waveguide component including a first waveguide core and a second waveguide core over a dielectric layer;
forming a third waveguide core over the dielectric layer;
forming a first slab layer coupled to a lower portion of the third waveguide core; and
forming a second slab layer coupled to a lower portion of the first waveguide core and a lower portion of the second waveguide core,
wherein the first waveguide core is separated from the second waveguide core by a slot, the third waveguide core positioned in a different level relative to the dielectric layer than the slotted waveguide component, the third waveguide core and the slot have an overlapping arrangement, the first slab layer is thinner than the third waveguide core, and the second slab layer is thinner than the first waveguide core and the second waveguide core.

12. The method of claim 11 wherein the slotted waveguide component is positioned between the third waveguide core and the dielectric layer.

13. The method of claim 12 wherein the third waveguide core comprises silicon nitride, and the slotted waveguide component comprises silicon.

14. The method of claim 11 wherein the third waveguide core is positioned between the slotted waveguide component and the dielectric layer.

15. The method of claim 14 wherein the third waveguide core comprises silicon, and the slotted waveguide component comprises silicon nitride.

16. The structure of claim 1 wherein the first waveguide core has a first side surface, the second waveguide core has a second side surface, and the first slot is positioned between the first side surface and the second side surface.

17. The structure of claim 1 wherein the first waveguide core, the second waveguide core, and the second slab layer comprise a semiconductor material, and the third waveguide core and the first slab layer comprise a dielectric material.

18. The structure of claim 1 wherein the first waveguide core, the second waveguide core, and the second slab layer comprise a dielectric material, and the third waveguide core and the first slab layer comprise a semiconductor material.

19. The structure of claim 7 wherein the second slab layer is coupled to a lower portion of the fourth waveguide core.

20. The structure of claim 10 wherein the first slab layer is coupled to a lower portion of the fourth waveguide core.

* * * * *